United States Patent
Yamaguchi

(10) Patent No.: US 9,404,828 B2
(45) Date of Patent: Aug. 2, 2016

(54) LEAK TEST METHOD AND LEAK TEST APPARATUS

(71) Applicant: Tetsuya Yamaguchi, Nagoya (JP)

(72) Inventor: Tetsuya Yamaguchi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 274 days.

(21) Appl. No.: 14/353,406

(22) PCT Filed: Oct. 22, 2012

(86) PCT No.: PCT/IB2012/002116
§ 371 (c)(1),
(2) Date: Apr. 22, 2014

(87) PCT Pub. No.: WO2013/061130
PCT Pub. Date: May 2, 2013

(65) Prior Publication Data
US 2014/0338427 A1    Nov. 20, 2014

(30) Foreign Application Priority Data
Oct. 26, 2011    (JP) .................. 2011-235510

(51) Int. Cl.
*G01M 3/02* (2006.01)
*G01L 19/00* (2006.01)
*G01M 3/34* (2006.01)
*G01M 3/32* (2006.01)

(52) U.S. Cl.
CPC ............. *G01M 3/02* (2013.01); *G01L 19/0092* (2013.01); *G01M 3/025* (2013.01); *G01M 3/3263* (2013.01); *G01M 3/34* (2013.01)

(58) Field of Classification Search
CPC ......... G01M 3/02; G01M 3/025; G01M 3/34; G01M 3/3263; G01L 19/0092
See application file for complete search history.

(56) References Cited

U.S. PATENT DOCUMENTS

| | | | |
|---|---|---|---|
| 5,482,683 A * | 1/1996 | Sheth ...................... | A61L 2/24 422/108 |
| 5,575,265 A * | 11/1996 | Kurihara ............ | F02M 25/0809 123/520 |
| 5,907,093 A | 5/1999 | Lehmann | |
| 6,308,556 B1 * | 10/2001 | Sagi .................... | G01M 3/3254 73/40 |

FOREIGN PATENT DOCUMENTS

| | | |
|---|---|---|
| JP | 60 111249 | 7/1985 |
| JP | 5 320400 | 12/1993 |

(Continued)

OTHER PUBLICATIONS

International Search Report Issued Jul. 8, 2013 in PCT/IB12/002116 Filed Oct. 22, 2012.

*Primary Examiner* — John Fitzgerald
*Assistant Examiner* — Michael E Turbyfill
(74) *Attorney, Agent, or Firm* — Oblon, McClelland, Maier & Neustadt, L.L.P

(57) ABSTRACT

A leak test method includes: reducing first pressure in an inspection space in a work and second pressure in a space in a master chamber; humidifying the inspection space in the work; and detecting a change in differential pressure between the inspection space in the work and the space in the master chamber, while the inspection space in the work is in a water-vapor saturated state. Also, in this leak test method, a leak in the inspection space in the work is detected from the change in the differential pressure.

8 Claims, 17 Drawing Sheets

(56) References Cited

FOREIGN PATENT DOCUMENTS

| | | |
|---|---|---|
| JP | 10 293076 | 11/1998 |
| JP | 2007 218745 | 8/2007 |
| JP | 2008-8909 A | 1/2008 |

* cited by examiner

FIG. 14
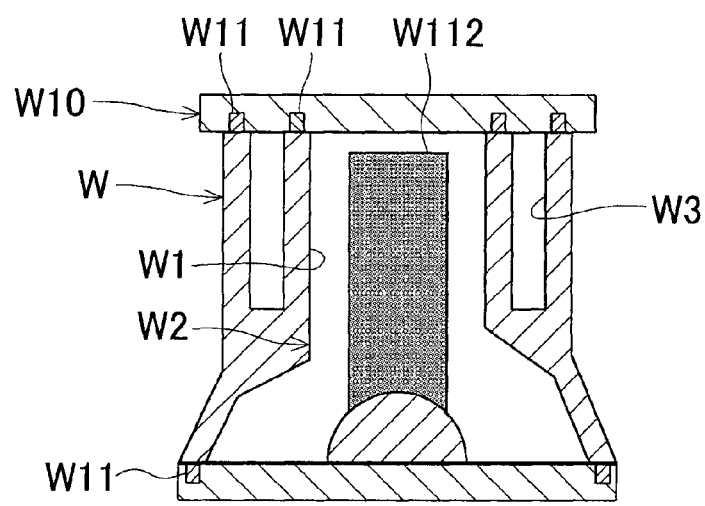
REDUCE PRESSURE
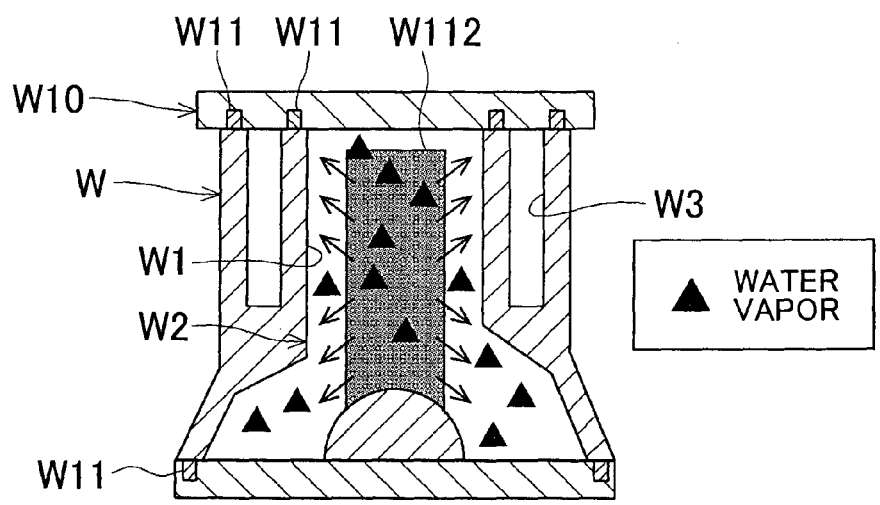

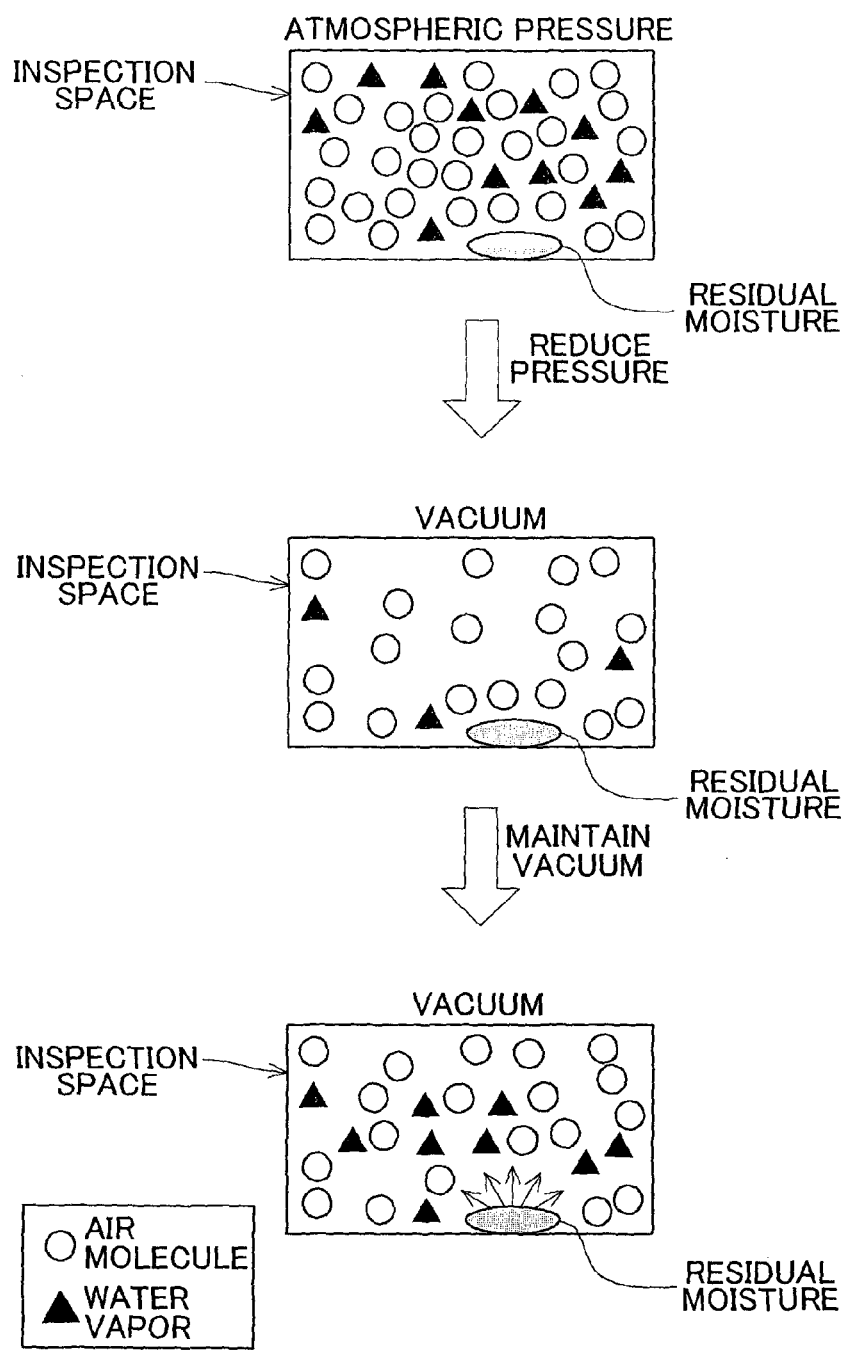

LEAK TEST METHOD AND LEAK TEST APPARATUS

BACKGROUND OF THE INVENTION

1. Field of the Invention

The invention relates to technology of a leak test method and a leak test apparatus that detects a leak in a space to be inspected in a work, i.e., an inspection space in a work.

2. Description of Related Art

A leak method according to related art involves increasing the pressure in an inspection space in a work and a space in a master chamber, and detecting a leak in the inspection space in the work by detecting a change in differential pressure between the spaces when a increased pressure state is being maintained. With such a leak test method, reaction force is generated in the work when the pressure is increased. Therefore, a cylinder or the like that applies thrust to a jig that seals the work ends up being larger. That is, the equipment for performing the leak test method ends up being larger.

Japanese Utility Model Application Publication No. 60-111249 (JP 60-111249 U) describes technology related to a leak test method that involves reducing the pressure in an inspection space of a work and a space in a reference tank (i.e., a master chamber), and detecting a change in differential pressure between the spaces using a differential pressure detector when the reduced pressure state is being maintained. Such a leak test method that reduces the pressure in the spaces does not generate reaction force in the work, so the equipment for performing the leak test method can be smaller.

FIG. 16 is a view showing the manner in which residual moisture in the inspection space in the work vaporizes. As shown in FIG. 16, there are cases in which moisture (such as coolant for example) used in a step performed prior to leak detection remains in the inspection space in a work that is to undergo leak detection. Residual moisture in the inspection space at atmospheric pressure is shown in FIG. 16. An example of such a case is when detecting a leak in an inspection space in a work in a mass-production environment where works are manufactured by machining.

The pressure in the inspection space in the work is reduced by air (i.e., air molecules and water vapor) being discharged outside, so the humidity decreases according to the degree of pressure reduction. The inspection space when the pressure has been reduced is shown in FIG. 16. That is, the inspection space in the work dries when the pressure is reduced. Leak detection of the inspection space in the work is performed maintaining the reduced pressure state. As a result, the inspection space in the work is kept in a dry state, and vaporization of the residual moisture ends up progressing. This vaporization of the residual moisture causes the water vapor pressure in the inspection space in the work to rise. A rise in the water vapor pressure in the inspection space when a vacuum is maintained is shown in FIG. 16. Therefore, during leak detection, the pressure in the inspection space changes, and the differential pressure also changes.

That is, with the technology described in JP 60-111249 U, when moisture remains in the inspection space in the work, as shown in FIG. 17A, a large change in the differential pressure occurs due to the vaporization of the residual moisture, even though there is no leak in the inspection space in the work. With the technology described in JP 60-111249 U, it is not possible to distinguish between a change in the differential pressure due to vaporization of residual moisture like that shown in FIG. 17A, and a change in the differential pressure when there is a leak in the inspection space in the work and air flows into the inspection space from outside, as shown in FIG. 17B. In FIG. 17B, the flow of air that flows in the inspection space is indicated by an arrow. That is, with the technology described in JP 60-111249 U, there is a possibility that a work in which there is no leak in the inspection space may end up being detected as a work in which there is a leak in the inspection space. That is, there is a possibility that false detection may end up occurring due to a rise in the water vapor pressure.

SUMMARY OF THE INVENTION

Therefore, the invention provides a leak test method and a leak test apparatus that prevents or minimizes false detection from occurring due to a rise in water vapor pressure. Hereinafter, the term "water-vapor saturated" is used as a term that includes a state in which an inspection space in the work is completely water-vapor saturated, as well as a state in which the inspection space in the work is humidified to a degree that prevents false detection from occurring due to a rise in water vapor pressure.

A first aspect of the invention relates to a leak test method that includes: reducing first pressure in an inspection space in a work and second pressure in a space in a master chamber; humidifying the inspection space in the work; and detecting a change in differential pressure between the inspection space in the work and the space in the master chamber, while the inspection space in the work is in a water-vapor saturated state. Also, in this leak test method, a leak in the inspection space in the work is detected from the change in the differential pressure.

In the first aspect of the invention, in humidifying the inspection space in the work, the inspection space in the work may be humidified from outside by introducing fluid that includes water vapor into the inspection space in the work by a humidifying device that is connected to the work.

In the structure described above, the first pressure and the second pressure may be reduced simultaneously with humidification of the inspection space in the work by reducing the first pressure, while a flowrate of the fluid introduced into the inspection space in the work is regulated by a throttle valve.

In the first aspect of the invention, in humidifying the inspection space in the work, the first pressure may be reduced while water-retentive material is arranged in the inspection space in the work.

A second aspect of the invention relates to a leak test apparatus that includes a master chamber, a pressure-reducing device, a humidifying device, and a detecting device. The pressure-reducing device is configured to reduce first pressure in an inspection space in a work and a second pressure in a space in the master chamber. The humidifying device is configured to humidify the inspection space in the work. The detecting device is configured to detect a change in differential pressure between the inspection space in the work and the space in the master chamber, while the inspection space in the work is in a water-vapor saturated state. Also, a leak in the inspection space in the work is detected from the change in the differential pressure.

In the second aspect of the invention, the humidifying device may be connected to the work, and humidify the inspection space in the work from outside by introducing fluid that includes water vapor into the inspection space in the work.

The leak test apparatus having the structure described above may also include a throttle valve that regulates a flowrate of the fluid introduced into the inspection space in the work. Also, the first pressure and the second pressure are reduced simultaneously with humidification of the inspection space in the work by reducing the first pressure, while the flowrate of the fluid is regulated by the throttle valve.

In the second aspect of the invention, the humidifying device may include water-retentive material arranged in the inspection space in the work, and moisture in the water-retentive material may be vaporized by reducing the first pressure.

In the second aspects of the invention, when the change in the differential pressure is detected, the inspection space in the work is in a water-vapor saturated state. Therefore, vaporization of moisture remaining in the inspection space in the work is suppressed, and thus false detection from occurring in the detecting step due to a rise in water vapor pressure is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a view of a humidifying step in the third modified example;

FIG. 16 is a view showing the manner in which residual moisture in the inspection space in the work vaporizes according to related art;

DETAILED DESCRIPTION OF EMBODIMENTS

Figure 1:
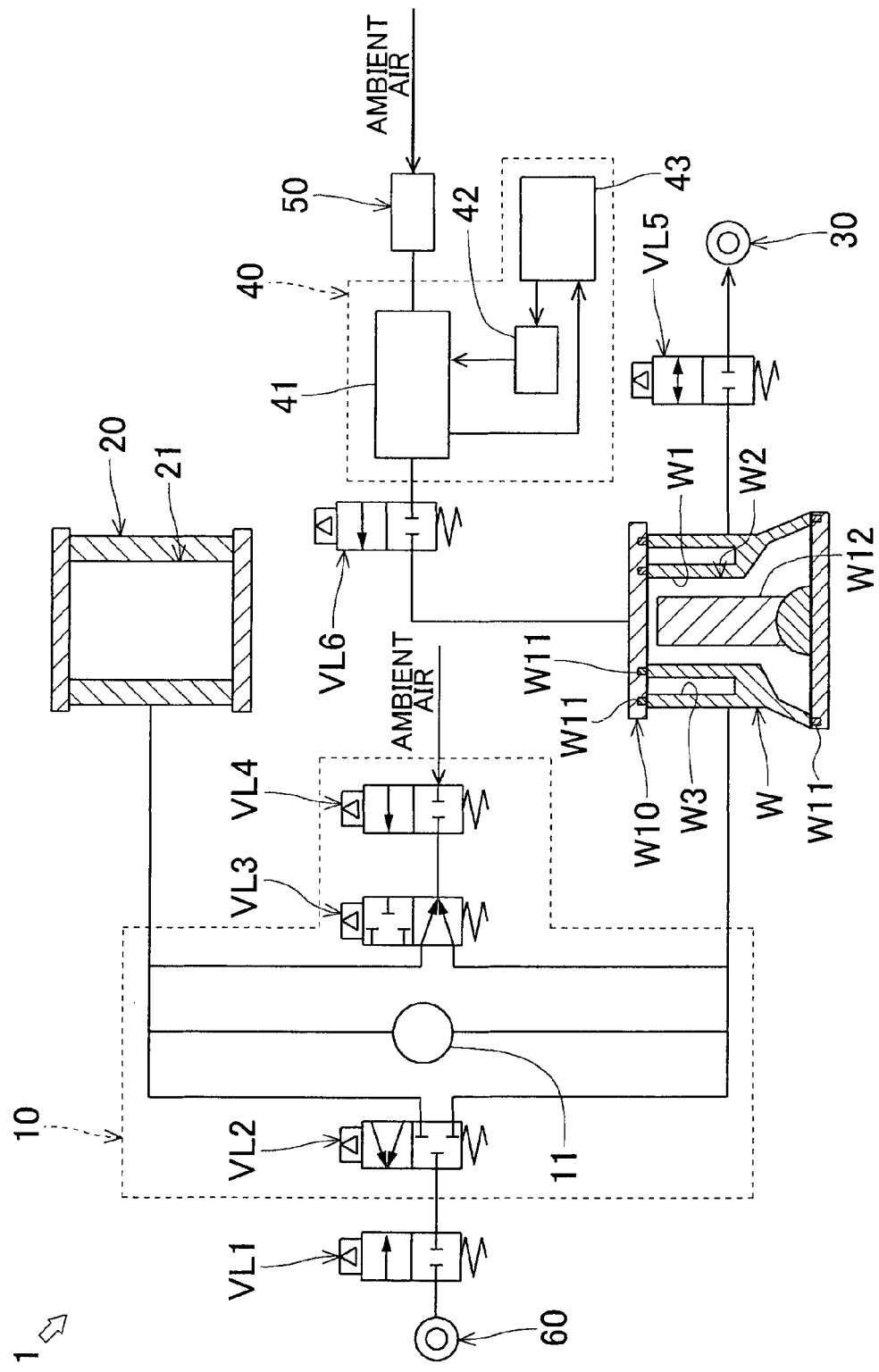
FIG. 1 is a view of the structure of a leak test apparatus according to one example embodiment of the invention.

Hereinafter, a leak test method and a leak test apparatus 1 according to an example embodiment of the invention will be described. As shown in FIG. 1, the leak test method and the leak test apparatus 1 detect the existence of a leak in an inspection space W2 formed in a work W.

The work W in this example embodiment is a cylinder block. The inspection space W2 is a space formed by a bore W1 of the cylinder block. The work W and the inspection space W2 are not limited to this example embodiment.

The leak test apparatus 1 includes a main body 10 of the leak test apparatus 1, a master chamber 20, a pressure-reducing pump 30, a humidifying mechanism 40, a throttle valve 50, and a pressure pump 60 and the like. The leak test apparatus 1 is constituted of the constituent members being connected together by a plurality of directional control valves (i.e., a first valve VL1 to a sixth valve VL6) and conduits and the like.

The main body 10 of the leak test apparatus 1 is arranged between the work W and the master chamber 20. The main body 10 of the leak test apparatus 1 detects a change in differential pressure between the inspection space W2 in the work W and a space 21 in the master chamber 20 using a differential pressure sensor 11. The second valve VL2, the third valve VL3, and the fourth valve VL4 are arranged inside the main body 10 of the leak test apparatus 1.

The second valve VL2 is arranged between the first valve VL1, and the work W and the master chamber 20, and is open when the second valve VL2 is on. When the second valve VL2 is open, the work W and the master chamber 20 are communicated with a conduit on the first valve VL1 side with respect to the second valve VL2. When the second valve VL2 is closed, the first valve VL1, the work W, and the master chamber 20 are cut off from each other.

The third valve VL3 is arranged between the fourth valve VL4, and the work W and the master chamber 20, and is open when the third valve VL3 is off. When the third valve VL3 is open, the work W and the master chamber 20 are communicated with a conduit on the fourth valve VL4 side with respect to the third valve VL3. When the third valve VL3 is closed, the fourth valve VL4, the work W, and the master chamber 20 are cut off from each other.

The fourth valve VL4 is arranged between the third valve VL3 and a silencer into which air is introduced, and is open when the fourth valve VL4 is on. When the fourth valve VL4 is open, the silencer is communicated with a conduit on the third valve VL3 side with respect to the fourth valve VL4. When the fourth valve VL4 is closed, the silencer is cut off from the conduit on the third valve VL3 side with respect to the fourth valve VL4. Also, turning the third valve VL3 off and turning the fourth valve VL4 on results in the work W and the master chamber 20 being communicated with the silencer, such that ambient air is introduced into the inspection space W2 in the work W and the space 21 in the master chamber 20 (see FIG. 9).

The master chamber 20 is a container that is sealed so that air will not leak out from the space 21 formed therein. The master chamber 20 is connected to the pressure pump 60 via the first valve VL1 and the second valve VL2, and is connected to the pressure-reducing pump 30 via the third valve VL3 and the fifth valve VL5.

The fifth valve VL5 is arranged between the work W and the pressure-reducing pump 30, and is open when the fifth valve VL5 is on. When the fifth valve VL5 is open, the work W is communicated with the pressure-reducing pump 30, and when the fifth valve VL5 is closed, the work W is cut off from the pressure-reducing pump 30.

The pressure-reducing pump 30 sucks in the air from within the spaces W2 and 21 and discharges it (i.e., the air) outside, thus reducing the pressure in the spaces W2 and 21. That is, the leak test apparatus 1 is configured such that air in the inspection space W2 in the work W that is sucked in during pressure reduction will not pass through the main body 10 of the leak test apparatus 1. That is, the pressure-reducing pump 30 is directly connected to the work W. Here, the pressure in the inspection space W2 in the work W serves as first pressure, and the pressure in the space 21 in a master chamber 20 serves as second pressure.

The humidifying mechanism 40 humidifies the inspection space W2 in the work W. The humidifying mechanism 40 includes a main body 41 of the humidifying mechanism 40, a circulation pump 42, and a water tank 43. The humidifying mechanism 40 is constituted of connecting the circulation pump 42 and the water tank 43 to the main body 41 of the humidifying mechanism 40.

Figure 2:
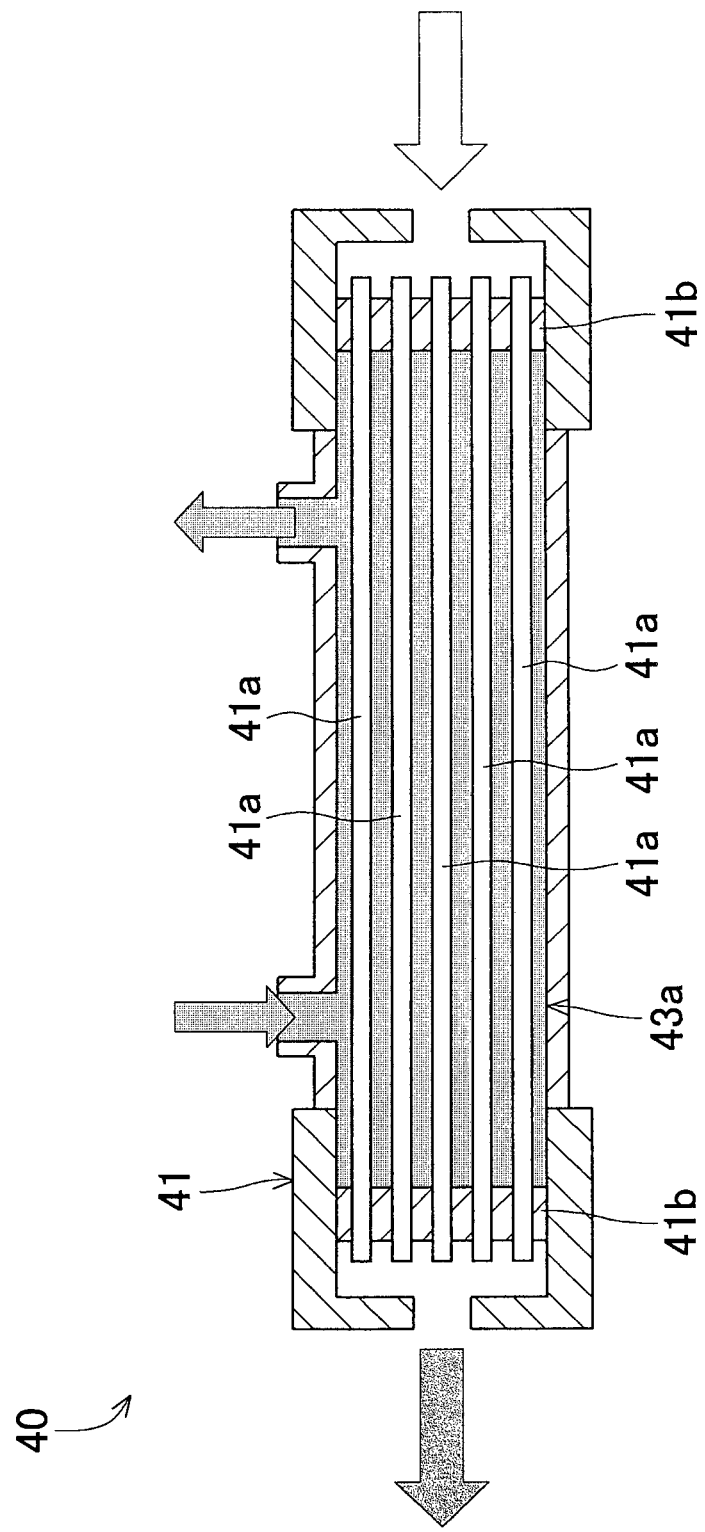
FIG. 2 is a view of the structure of a main body of a humidifying mechanism.
Figure 3:
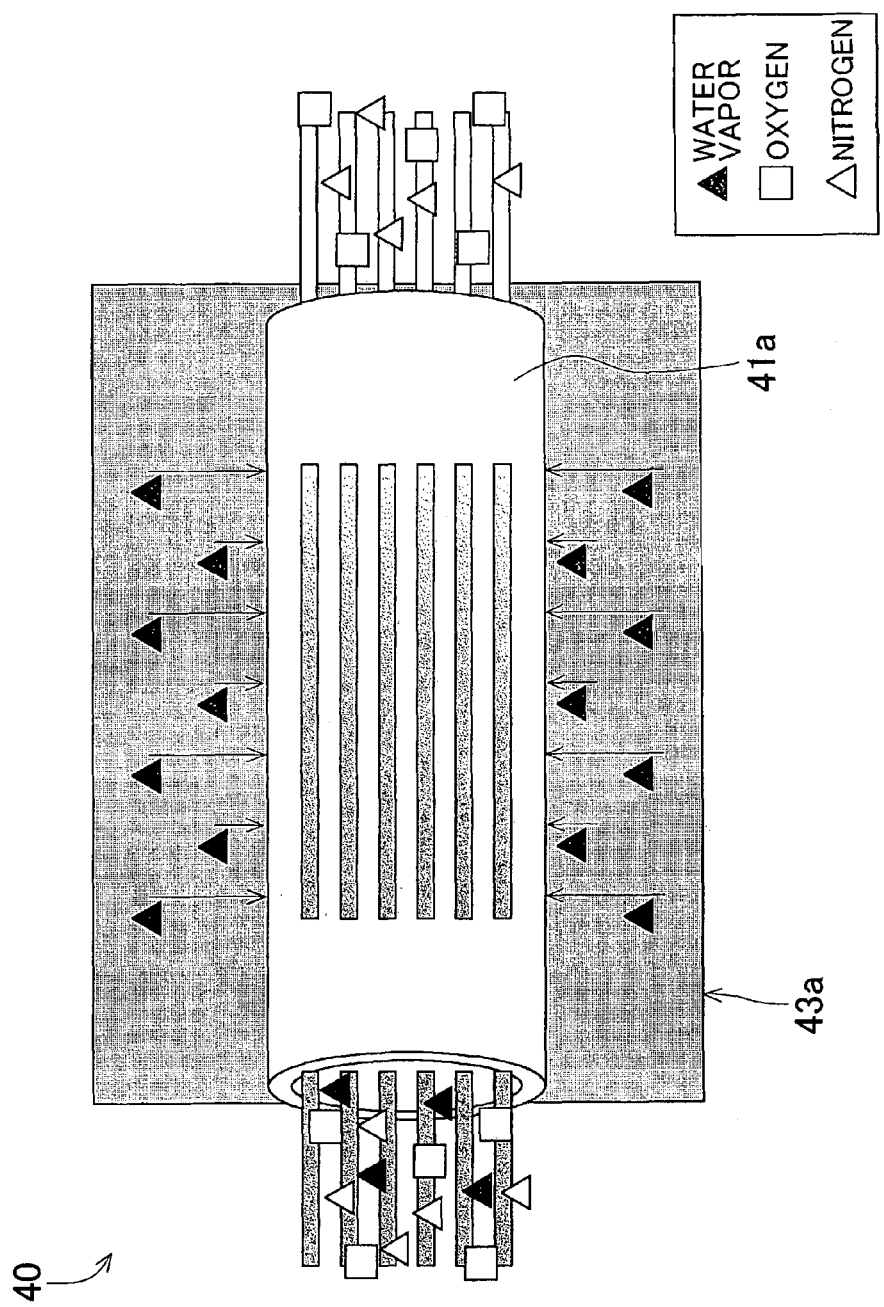
FIG. 3 is a view of the operation of the humidifying mechanism.

As shown in FIGS. 2 and 3, a plurality of hollow fiber membranes 41a are housed in the main body 41 of the humidifying mechanism 40. Both end portions of the hollow fiber membranes 41a in a longitudinal direction are open. The open portions are connected together in succession, i.e., the open portions are arranged adjacent to each other in a plane. As described above, the hollow fiber membranes 41a are formed of a tube. The hollow fiber membranes 41a are bundled in a humidifying direction (i.e., the direction from the left side to the right side of the paper on which FIG. 2 is drawn, i.e., the longitudinal direction), and the both end portions in this longitudinal direction are fixed with resin 41b each other.

As shown in FIGS. 1 and 2, the humidifying mechanism 40 circulates water 43a in the water tank 43 between the main body 41 of the humidifying mechanism 40 and the water tank 43 using the circulation pump 42. In FIG. 2, the arrows on the upper side of the main body 41 of the humidifying mechanism 40 (i.e., the arrows pointing perpendicular to the longitudinal direction) indicate the flow of water circulating between the main body 41 of the humidifying mechanism 40 and the water tank 43. Accordingly, the humidifying mechanism 40 selectively allows only water vapor to pass into the hollow fiber membranes 41a, and water-vapor saturates the air passing through the inside of the hollow fiber membranes 41a. Here, the manner in which the air is water-vapor saturated is indicated by the arrows on both the left and right sides of the main body 41 of the humidifying mechanism 40 in FIG. 2 (i.e., the arrows pointing in the longitudinal direction), and by the water vapor in FIG. 3. This kind of humidifying mechanism 40 is connected to the work W via the sixth valve VL6, as shown in FIG. 1.

The sixth valve VL6 is arranged between the work W and the humidifying mechanism 40, and is open when the sixth valve VL6 is on. When the sixth valve VL6 is open, the work W is communicated with the humidifying mechanism 40, and when the sixth valve VL6 is closed, the work W is cut off from the humidifying mechanism 40. That is, the humidifying mechanism 40 humidifies the inspection space W2 in the work W by turning on the sixth valve VL6 and introducing water-vapor saturated air into the inspection space W2 in the work W from the humidifying mechanism 40 (see FIG. 5).

Ambient air is introduced by the silencer into the throttle valve 50. The flowrate of the ambient air is regulated before it is introduced into the humidifying mechanism 40 by adjusting the opening amount of the throttle valve 50.

The pressure pump 60 fills each of the spaces W2 and 21 with compressed air to increase the pressure in the spaces W2 and 21. The pressure pump 60 is connected to the work W and the master chamber 20 via the first valve VL1 and the second valve VL2.

The first valve VL1 is arranged between the pressure pump 60 and the second valve VL2, and is open when the first valve VL1 is on. When the first valve VL1 is open, the pressure pump 60 is communicated with a conduit on the second valve VL2 side with respect to the first valve VL1, and when the first valve VL1 is closed, the pressure pump 60 is cut off from the conduit on the second valve VL2 side. That is, when increasing the pressure in the spaces W2 and 21, the first valve VL1 and the second valve VL2 are on.

The valves VL1 to VL6 perform predetermined valve sequence control (for example, valve sequence control such as that shown in FIG. 4) by receiving predetermined signals from a controller, not shown.

The work W is connected to the master chamber 20 via the second valve VL2 and the third valve VL3. The differential pressure sensor 11 detects a change in differential pressure between the spaces W2 and 21 when all of the valves VL1 to VL6 are closed (see FIG. 7). When detecting a leak in the inspection space W2, a jig W10 that seals the inspection space W2 is attached to the work W.

When the work W is a cylinder block as it is in this example embodiment, a single rubber cord W11 that seals the work W is attached to a lower side of the jig W10. A water jacket W3 that circulates coolant of an engine is formed in an upper side of the work W. Therefore, two rubber cords W11 that separate the bore W1 from the water jacket W3 and seal the work W are attached to the upper side of the jig W10.

A core W12 for reducing the volume of the inspection space W2 in the work W is provided with this kind of jig W10. Providing the core W12 with the jig W10 makes pressure fluctuation in the inspection space W2 in the work W due to a leak relatively large, so the measurement value of the differential pressure sensor 11 will be even larger.

Next, operation of the leak test method that is performed using the leak test apparatus 1 will be described.

Figure 4:
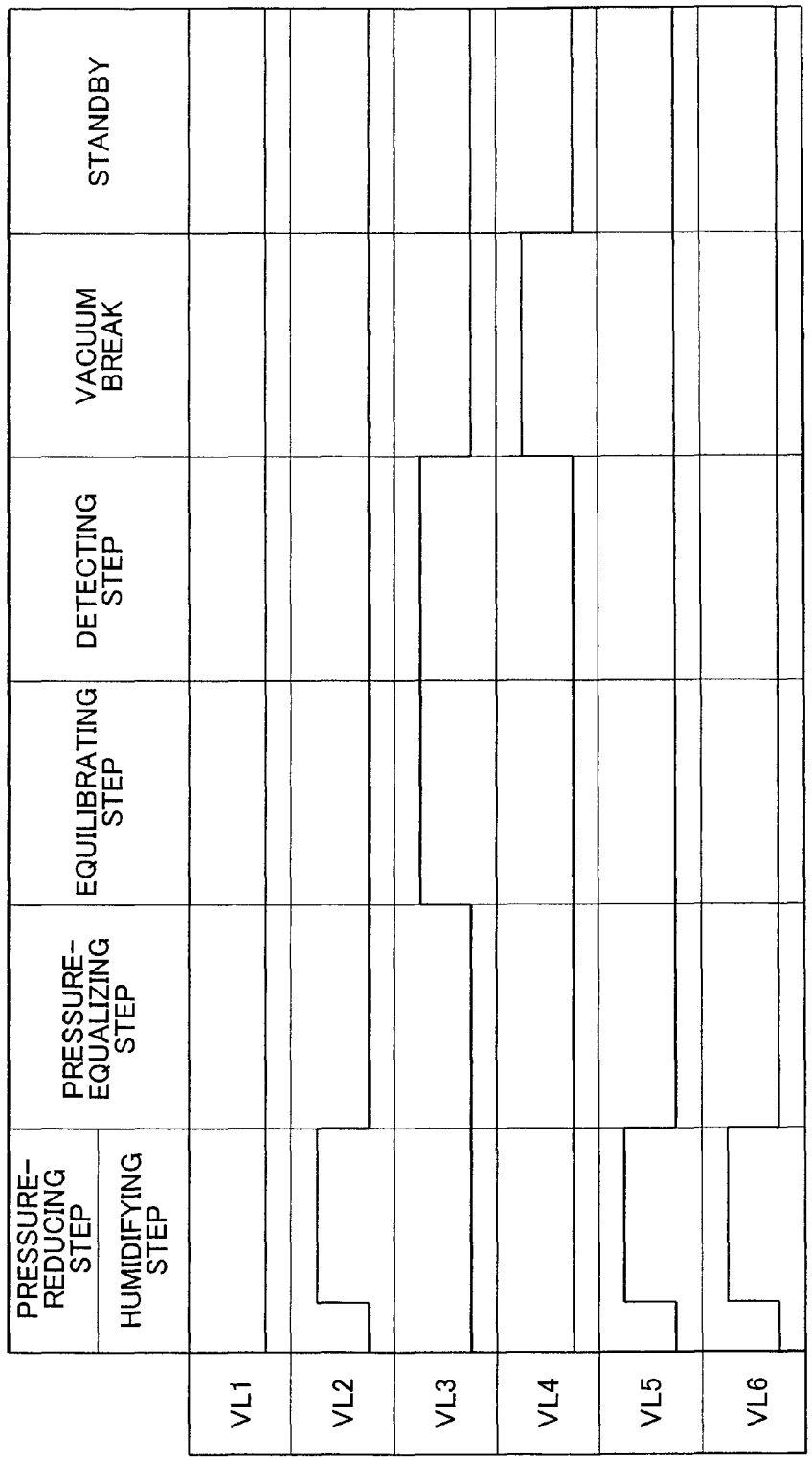
FIG. 4 is a view of a valve sequence.

As shown in FIG. 4, first with the leak test method of this example embodiment, a pressure-reducing step and a humidifying step are performed. FIG. 4 shows the switching states of the valves VL1 to VL6 as sequences. More specifically, in the valve sequences shown in FIG. 4, when the lines indicating the sequences are positioned on the upper side, it indicates that the valves VL1 to VL6 are on, and when the lines indicating the sequences are positioned on the lower side, it indicates that the valves VL1 to VL6 are off.

Figure 5:
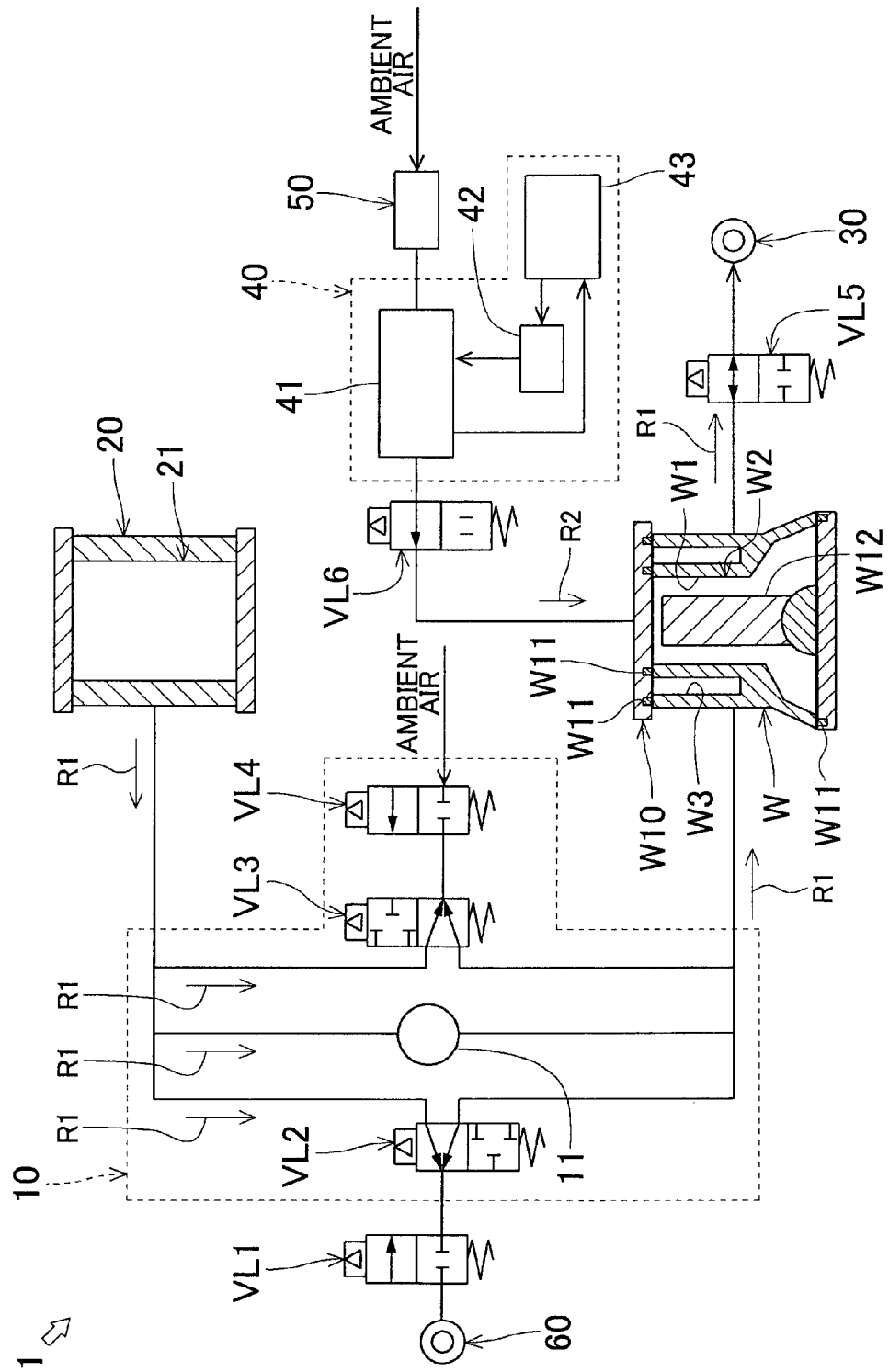
FIG. 5 is a view of the state of each valve in a pressure-reducing step and a humidifying step.

In the pressure-reducing step and the humidifying step, as shown in FIGS. 1 and 4, the valves VL1 to VL6 are turned off until a predetermined period of time has passed. Then after the predetermined period of time has passed, in the pressure-reducing step and the humidifying step, the second valve VL2, the fifth valve VL5, and the sixth valve VL6 are turned on as shown in FIGS. 4 and 5. That is, in the pressure-reducing step and the humidifying step, the second valve VL2, the third valve VL3, the fifth valve VL5, and the sixth valve VL6 open. At this time, the pressure-reducing pump 30 and the humidifying mechanism 40 start to operate.

That is, the leak test apparatus 1 sucks in the air from the spaces W2 and 21 using the pressure-reducing pump 30 and discharges it (i.e., the air) outside. The arrow R1 in FIG. 5 indicates the flow of the air that is sucked in and discharged outside. In this way, with the leak test method according to this example embodiment, the pressure-reducing step that reduces the pressure inside the spaces W2 and 21 is performed.

Figure 6:
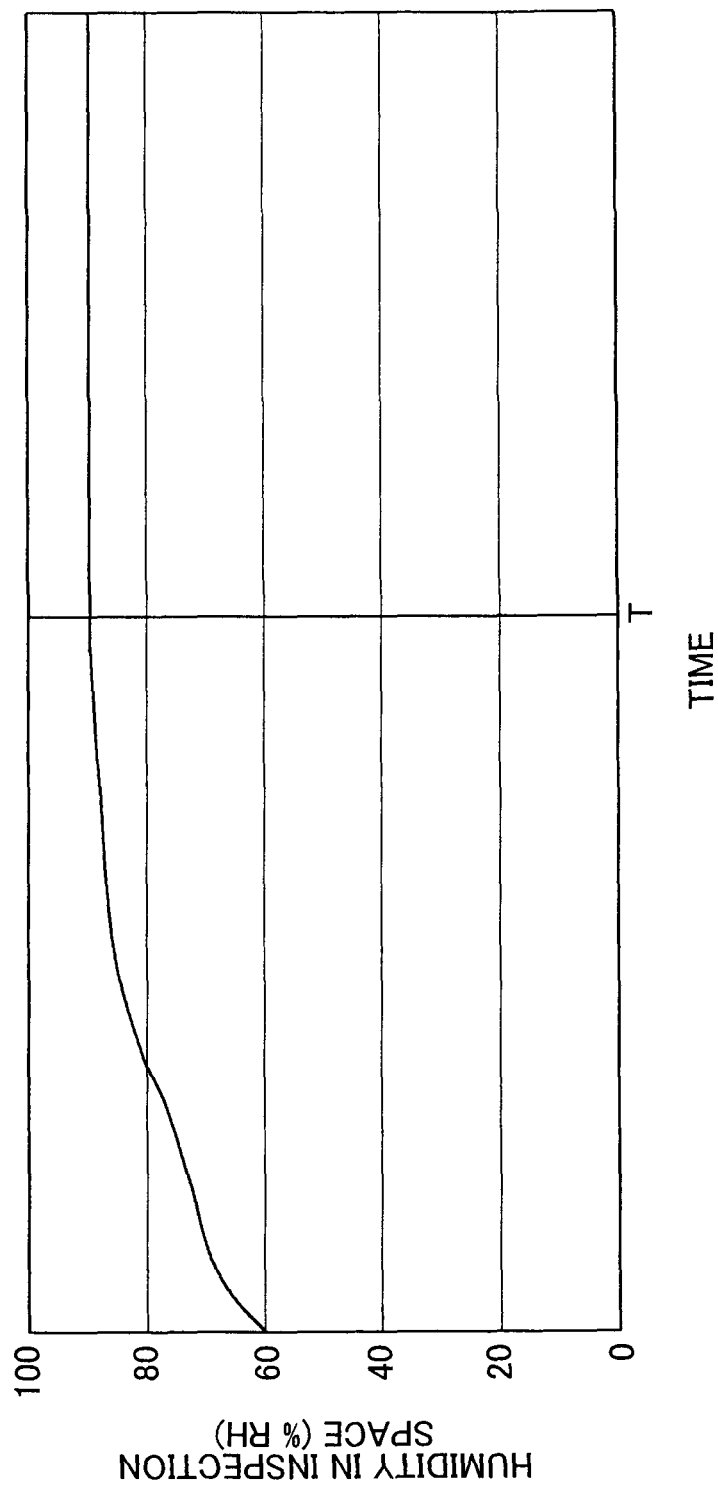
FIG. 6 is a view of a change in the humidity in an inspection space in a work in the humidifying step.

When reducing the pressure in the spaces W2 and 21, the air in the humidifying mechanism 40 is also sucked in by the pressure-reducing pump 30, so air in the water-vapor saturated state is introduced into the inspection space W2 in the work W from the humidifying mechanism 40. The arrow R2 in FIG. 5 indicates the flow of the air in the water-vapor saturated state that is introduced. Accordingly, the inspection space W2 in the work W is gradually humidified, as shown in FIG. 6. In this way, with the leak test method according to this example embodiment, the humidifying step that humidifies the inspection space W2 in the work W is performed. Also, the humidifying mechanism 40 serves as a humidifying device for humidifying the inspection space W2 in the work W.

As shown in FIG. 5, when humidifying the inspection space W2 in the work W, ambient air is introduced into the humidifying mechanism 40 via the throttle valve 50. That is, the flowrate of the air in the water-vapor saturated state that is introduced into the work W from the humidifying mechanism 40 is less than the flowrate of air that is discharged by the pressure-reducing pump 30. Therefore, the pressure-reducing pump 30 gradually reduces the pressure inside the inspection space W2 in the work W, even though the degree of pressure reduction by the pressure-reducing pump 30 decreases somewhat due to the air being introduced from the humidifying mechanism 40.

That is, with the leak test apparatus 1, the degree of pressure reduction by the pressure-reducing pump 30 is set taking into account the effect from the humidifying mechanism 40. Also, the opening amount of the throttle valve 50 is adjusted to achieve the set degree of pressure reduction.

Figure 8:
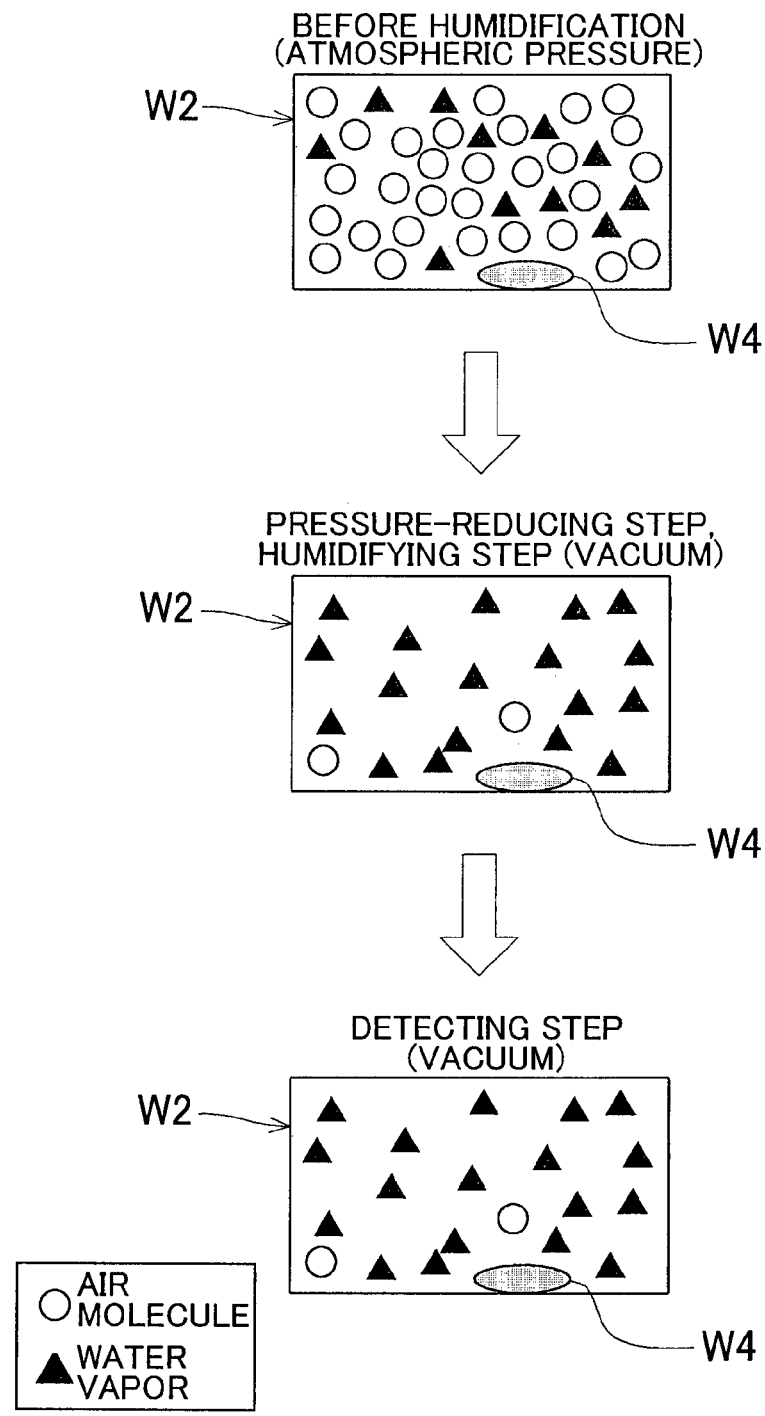
FIG. 8 is a view of the state of the inspection space in the work in a leak test method of the example embodiment.

In the leak test method according to this example embodiment, when the time T has passed, the pressure-reducing step and the humidifying step end, as shown in FIG. 6. At this time, the pressure in the inspection space W2 in the work W is reduced to a predetermined pressure set in leak detection, and is water-vapor saturated. FIG. 8 shows the inspection space W2 in the work W in a water-vapor saturated state during the pressure-reducing and humidifying steps.

In this way, in the leak test method according to this example embodiment, the pressure-reducing step and the humidifying step are performed simultaneously by reducing the pressure in the inspection space W2 in the work W while the flowrate of the water-vapor saturated air that is introduced into the inspection space W2 in the work W is regulated by the throttle valve 50. That is, the first pressure (i.e., the pressure in an inspection space W2 in a work W) and the second pressure (i.e., the pressure in a space 21 in a master chamber 20) are reduced simultaneously with humidification of the inspection space W2 in the work W by reducing the first pressure, while a flowrate of the fluid introduced into the inspection space W2 in the work W is regulated by a throttle valve 50. Also, the leak test apparatus simultaneously reduces the pressure in the spaces W2 and 21 and humidifies the inspection space W2 in the work W, by reducing the pressure in the inspection space W2 in the work W while the flowrate of the water-vapor saturated air that is introduced into the inspection space W2 in the work W is regulated by the throttle valve 50.

Accordingly, the leak test apparatus 1 and the leak test method according to this example embodiment reduce the pressure in, and humidify, the inspection space W2 in the work W simply by opening the second valve VL2, the third valve VL3, the fifth valve VL5, and the sixth valve VL6. That is, the leak test apparatus 1 and the leak test method according to this example embodiment are able to simplify valve sequence control in the pressure-reducing step and the humidifying step.

The position in which the throttle valve 50 is arranged need simply be a position that enables the flowrate of the water-vapor saturated air to be regulated, and is not limited to this example embodiment.

When the pressure is reduced, the temperature of the spaces W2 and 21 consequently drops. Then the temperature of the spaces W2 and 21 rises until a predetermined period of time passes, and then stabilizes. This kind of temperature rise affects the leak detection results. Therefore, after the pressure-reducing step and the humidifying step have ended, in the leak test method of this example embodiment, a pressure-equalizing step is performed that turns off the valves VL1 to VL6, as shown in FIGS. 1 and 4, and then waits for a certain amount of time. As a result, with the leak test method according to this example embodiment, the temperature of the spaces W2 and 21 is stabilized.

Figure 7:
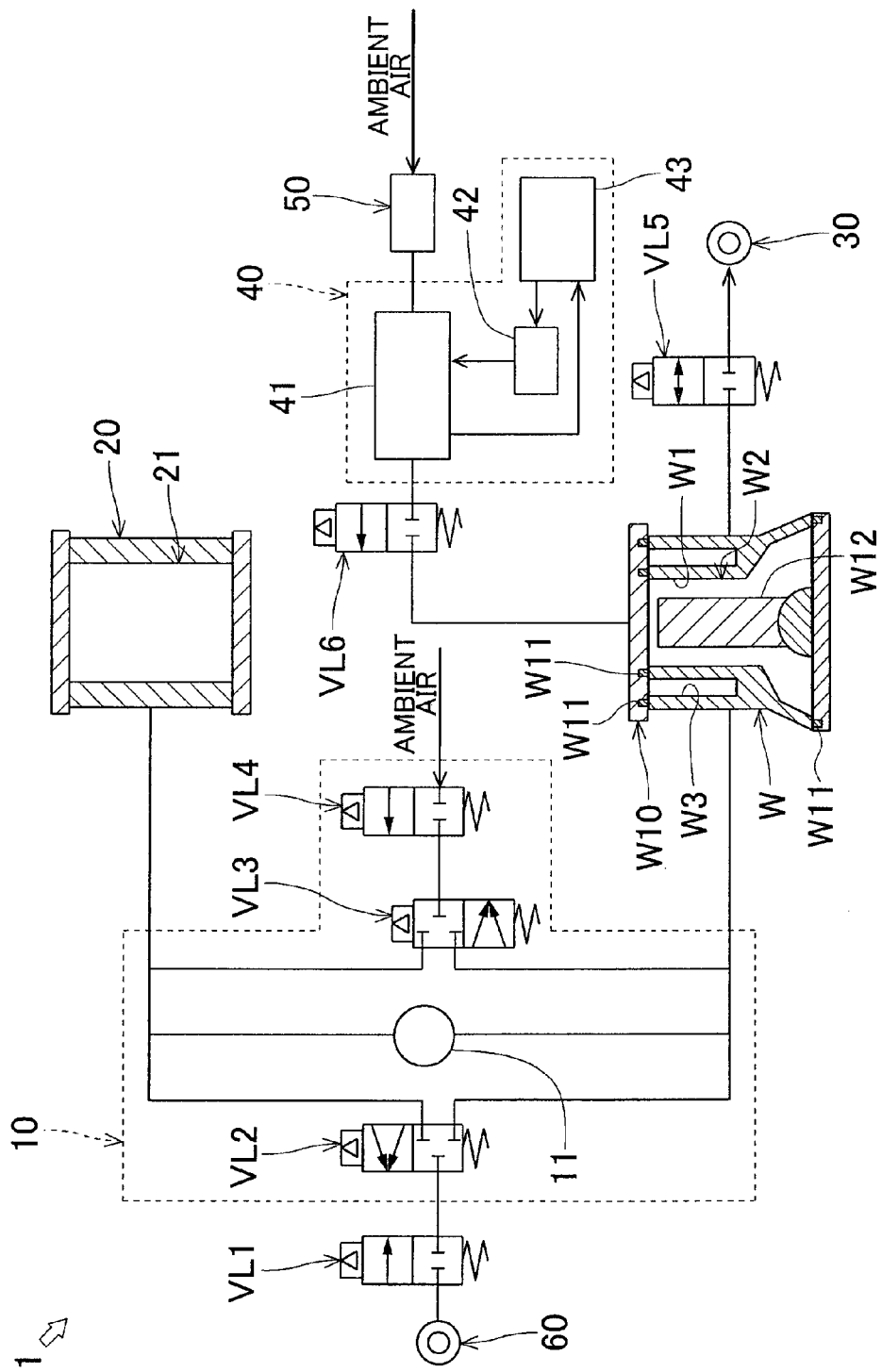
FIG. 7 is a view of the state of each valve in an equilibrating step and a detecting step.

After the pressure-equalizing step is performed, in the leak test method according to this example embodiment, an equilibrating step is performed that turns on only the third valve VL3, as shown in FIGS. 4 and 7, and then waits for a certain amount of time. That is, in the equilibrating step, the third valve VL3 is closed, so all of the valves VL1 to VL6 are closed. As a result, with the leak test method according to this example embodiment, pressure fluctuation generated when the third valve VL3 is closed is prevented from affecting the leak detection results.

After the equilibrating step is performed, a detecting step is performed in the leak test method according to this example embodiment. In the detecting step, a change in differential pressure between the spaces W2 and 21 is detected by the differential pressure sensor 11 while the valves VL1 to VL6 are closed. If the measurement value of the differential pressure sensor 11 exceeds a predetermined threshold value, then in the leak test method according to this example embodiment, it is determined that there is a leak in the inspection space W2 in the work W. Thus, the leak test method and the leak test apparatus 1 according to this example embodiment detect a leak of the inspection space W2 in the work W from a change in the differential pressure between the pressure-reduced spaces W2 and 21.

As shown in FIG. 8, in the detecting step, the inspection space W2 in the work W is in a state in which the pressure therein has been reduced to a predetermined pressure, and is in a water-vapor saturated state. As described above, FIG. 8 shows the inspection space W2 in the work W in a water-vapor saturated state in the pressure-reducing step and the humidifying step. Therefore, with the leak test method according to this example embodiment, even if moisture W4 remains in the inspection space W2 in the work W, vaporization of the residual moisture W4 is suppressed in the detecting step. FIG. 8 shows the manner in which vaporization of the residual moisture W4 in the inspection space W2 in the work W is suppressed during the detecting step.

That is, with the related art, a change in the differential pressure occurs due to the residual moisture W4, but with the leak test method according to this example embodiment, this change in the differential pressure is suppressed. Therefore, with the leak test method according to this example embodiment, a change in differential pressure is detected by the differential pressure sensor 11 only when there is a leak in the inspection space W2 in the work W. As described above, FIG. 17B is a view showing a state in which there is a leak in the inspection space W2 in the work W.

According to the leak test method and the leak test apparatus 1 of this example embodiment, a work W in which there is no leak in the inspection space W2 is prevented from being detected as a work W in which there is a leak in the inspection space W2. That is, the leak test method and the leak test apparatus 1 according to this example embodiment prevent false detection from occurring due to a rise in water vapor pressure.

In this way, with the leak test method of this example embodiment, the detecting step that detects a change in differential pressure is performed while the inspection space W2 in the work W is in a water-vapor saturated state. Also, the leak test apparatus 1 serves as a detecting device for detecting a change in differential pressure while the inspection space W2 in the work W is in a water-vapor saturated state.

Figure 9:
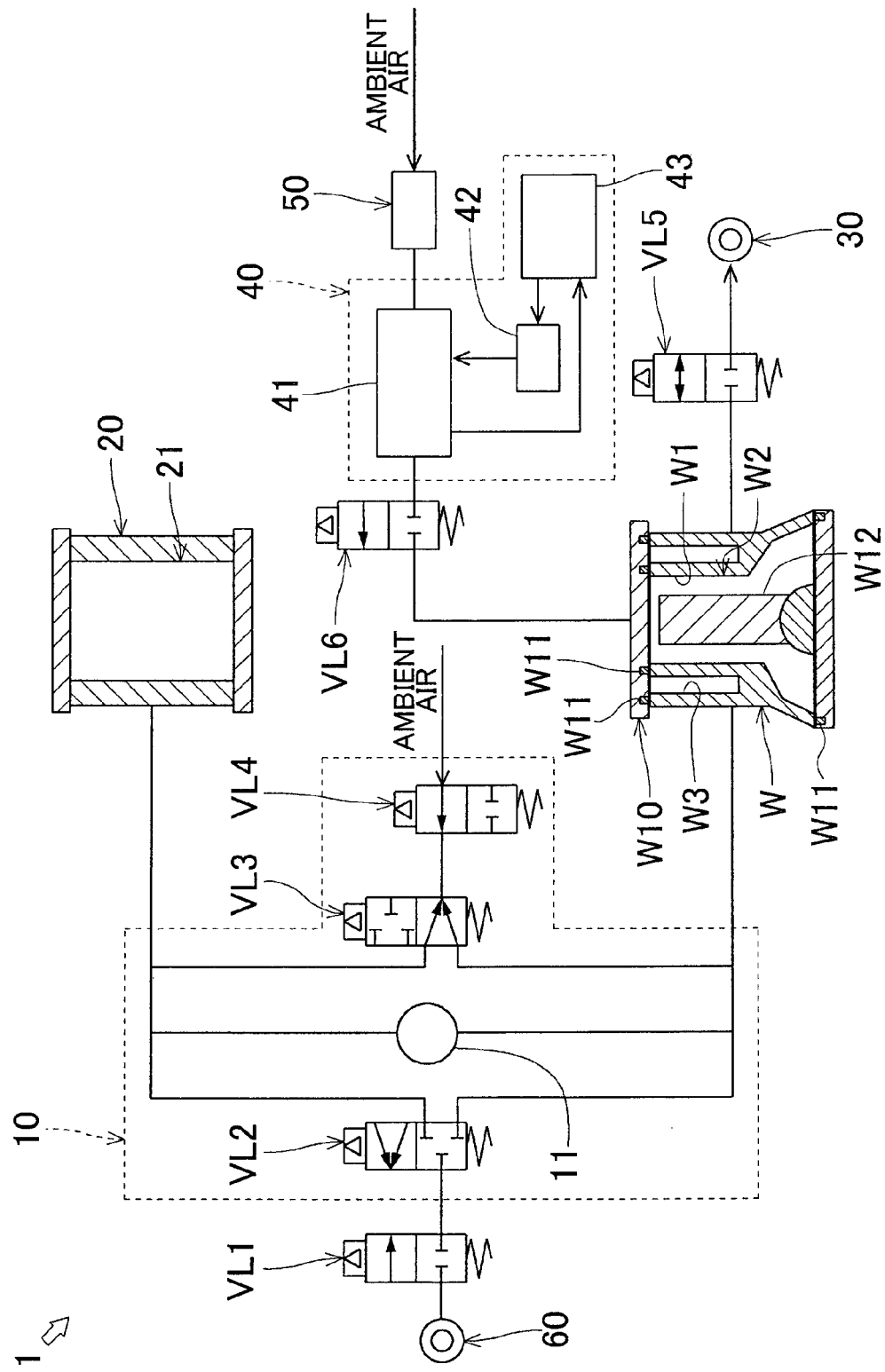
FIG. 9 is a view of the state of each valve during a vacuum break.

After the detecting step is performed, in the leak test method according to this example embodiment, a vacuum break is performed by turning off the third valve VL3 and turning on the fourth valve VL4, as shown in FIGS. 4 and 9. That is, the third valve VL3 and the fourth valve VL4 are opened such that ambient air is introduced into the spaces W2 and 21, and as a result, the pressure in the spaces W2 and 21 becomes atmospheric pressure. With this, the leak detection of the inspection space W2 ends. Hereinafter, this leak detection will be referred to as a "leak test".

After the vacuum break is performed, in the leak test method according to this example embodiment, the valves VL1 to VL6 are turned off, as shown in FIGS. 1 and 4, and the leak test apparatus 1 is placed on standby. While on standby, the work W that has finished the leak test is replaced by another work W to be tested.

According to the leak test method and the leak test apparatus 1 of this example embodiment, even in an environment in which it is assumed that there is moisture W4 remaining in the inspection space W2 in the work W (such as in a mass-production environment where works W are manufactured by machining, for example), the leak test is able to be performed without false detection occurring (or while suppressing false detection from occurring) due to a rise in the water vapor pressure.

In the humidifying step, the inspection space W2 in the work W need only be humidified within a range that will not affect the result of the leak test. It is not absolutely necessary to completely water-vapor saturate the inspection space W2 in the work W.

Next, the test results related to the leak test method of this example embodiment will be described.

Figure 10:
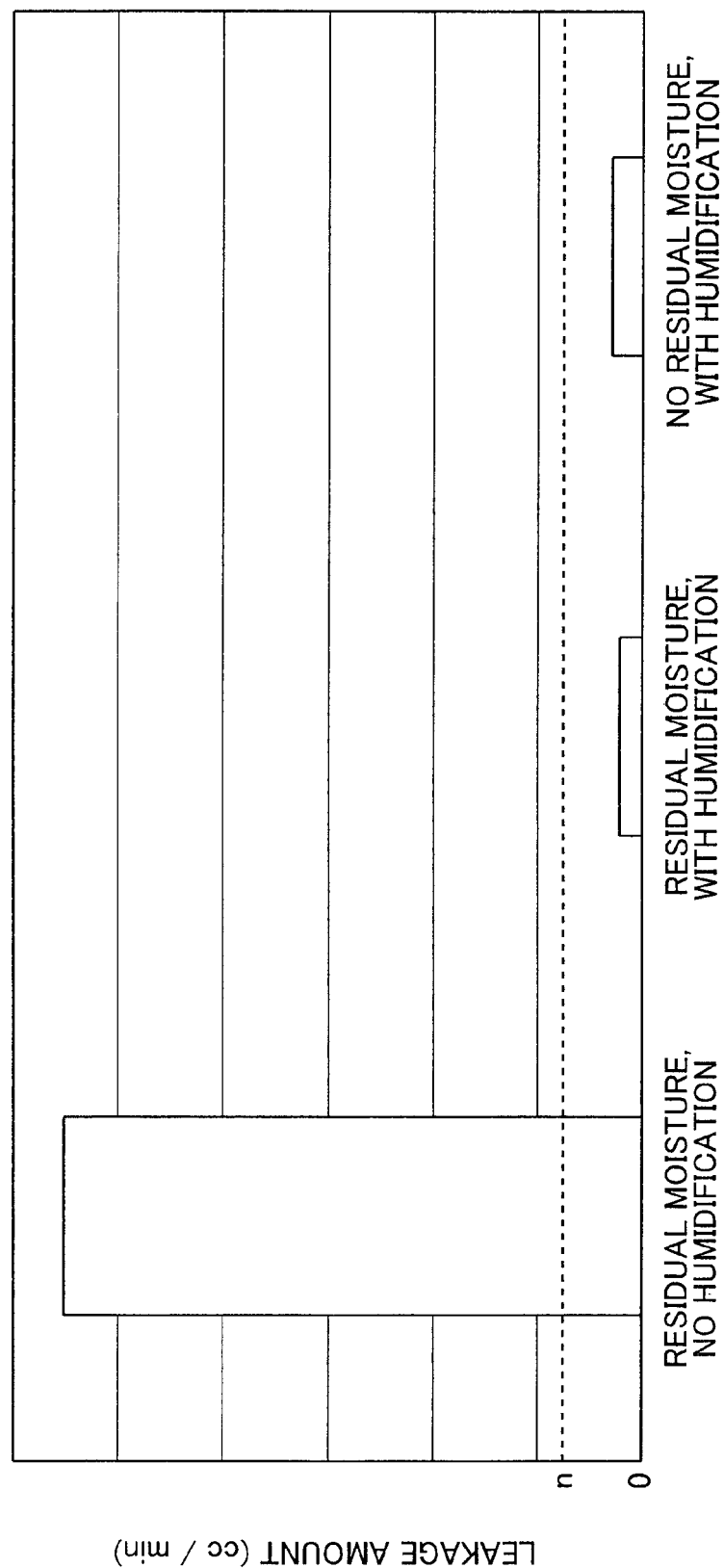
FIG. 10 is a view of test results using the leak test method according to the example embodiment.

For the test, a leak test using the leak test method of this example embodiment and a leak test not using the leak test method of this example embodiment (i.e., without performing the humidifying step) were repeatedly performed on a work W in which there was no leak in the inspection space W2. Also, the average value of the leakage amount into which the measurement value of the differential pressure sensor 11 was converted was calculated. FIG. 10 is a view of the test results.

The bar graph shown on the left end in FIG. 10 denotes the result of a leak test that was performed, in which a predetermined amount of moisture W4 was left in the inspection space W2 in the work W and the leak test method of the example embodiment was not used. A leakage amount that largely exceeds a specified value n set as a measurement error of the leak test apparatus 1 was detected as the result of this kind of leak test.

Figure 17A:
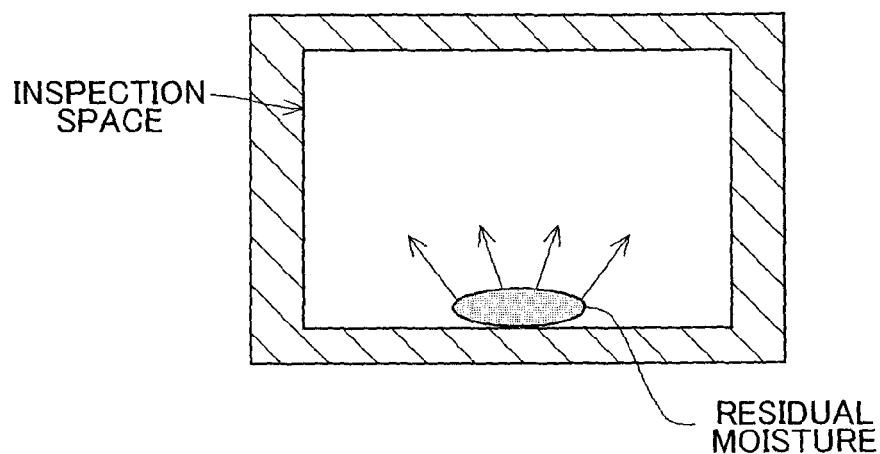
FIG. 17A is a view of moisture remaining in the inspection space in the work according to the related art.
Figure 17B:
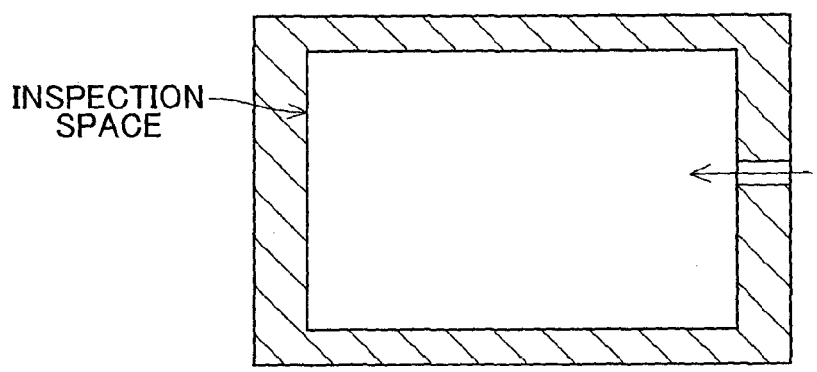
FIG. 17B is a view showing a leak in the inspection space in the work.

From the bar graph shown on the left end, it is evident that when the leak test in which a predetermined amount of moisture W4 remains in the inspection space W2 in the work W and the leak test method of the example embodiment was not used was performed, the result of the leak test is affected by a change in the differential pressure due to vaporization of the residual moisture W4. That is, it is evident that when the leak test was performed without using the leak test method according to this example embodiment, false detection occurs due to a rise in the water vapor pressure. As described above, the manner in which false detection occurs due to a rise in the water vapor pressure is illustrated in FIG. 17A.

The bar graph shown in the center in the left-right direction in FIG. 10 denotes the result of a leak test that was performed, in which a predetermined amount of moisture W4 was left in the inspection space W2 in the work W and the leak test method of the example embodiment was used. A leakage amount that is smaller than the specified value n was detected as the result of this kind of leak test.

From this bar graph, it is evident that when the leak test was performed using the leak test method according to the example embodiment while the moisture W4 remains in the inspection space W2 in the work W, vaporization of this residual moisture W4 is suppressed, so a proper detection result was obtained. That is, it is evident that when the leak test was performed using the leak test method according to this example embodiment, false detection is prevented from occurring due to a rise in the water vapor pressure, as is the case when the leak test method of this example embodiment is not used.

The bar graph shown on the right end in FIG. 10 denotes the result of a leak test that was performed, in which no moisture W4 was left in the inspection space W2 in the work W and the leak test method of the example embodiment was used. A leakage amount that is smaller than the specified value n was detected as the result of this kind of leak test.

From this, it is evident that a proper detection result is obtained when a leak test is performed using the leak test method of this example embodiment, regardless of whether there is moisture W4 remaining in the inspection space W2 in the work W.

In the humidifying step, the inspection space W2 in the work W need only be humidified within a range that will not affect the result of the leak test. It is not absolutely necessary to completely water-vapor saturate the inspection space W2 in the work W. For example, the water-vapor saturated state may also include a state in which the inspection space W2 in the work W is humidified to an extent at which a leakage amount smaller than the specified value n will be detected.

As shown in FIG. 1, the leak test apparatus 1 may be configured to execute a leak test that increases the pressure in the spaces W2 and 21 using the pressure pump 60, and detects a fluctuation in the differential pressure using the differential pressure sensor 11.

In this case, the leak test apparatus 1 may perform a pressure-increasing step instead of the pressure-reducing step and the humidifying step shown in FIG. 4. In this pressure-increasing step, the leak test apparatus 1 increases the pressure in the spaces W2 and 21 by turning on the first valve VL1 and the second valve VL2, turning off the third valve VL3 through the sixth valve VL6, and filling the spaces W2 and 21 with compressed air. After the pressure-increasing step is the same as it is in the leak test described above.

In the leak test that reduces the pressure in the spaces W2 and 21, pressure is only able to be applied to the work W up to the pressure when the inspection space W2 in the work W is evacuated.

Here, in the leak test, there may be times when a leak test is performed by applying a pressure higher than the pressure when the work W is evacuated. In such a case, a leak test may be performed, for example, on a portion (such as the water jacket W3 or the like) where high pressure is applied when the work W is used for a prescribed use.

That is, by being configured to reduce and increase the pressure in the spaces W2 and 21 using the pressure-reducing pump 30 and the pressure pump 60, the leak test apparatus 1 perform an optimal leak test according to the portion of the work W.

As shown in FIG. 5, the pressure-reducing pump 30 is configured to be directly connected to the work W. Accordingly, the leak test apparatus 1 directly discharge water vapor and the like in the air inside the inspection space W2 in the work W.

Figure 15:
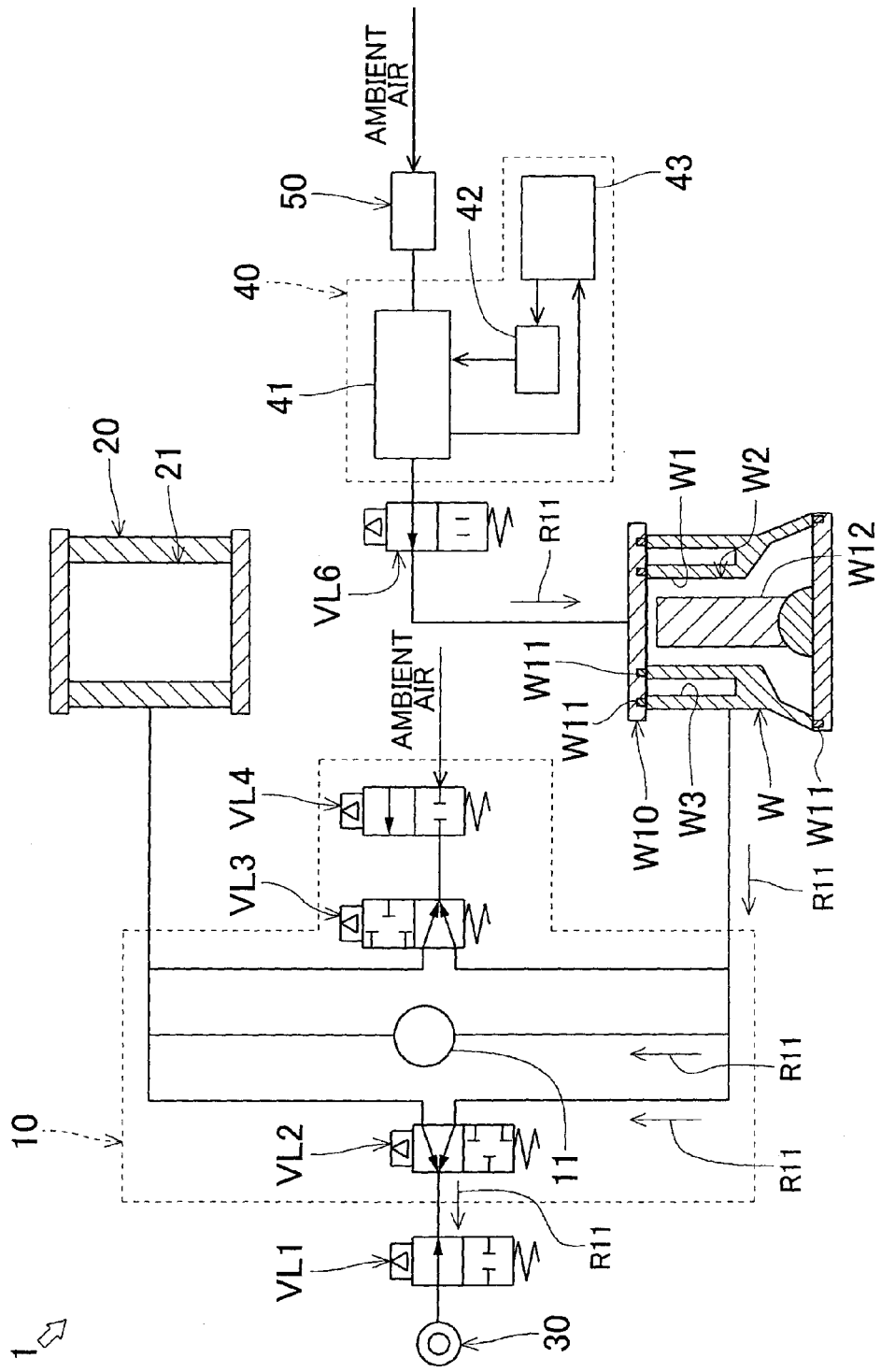
FIG. 15 is a view of the flow of air during pressure reduction in the inspection space, when a main body of the leak test apparatus is arranged between a work and a pressure-reducing pump.

If the pressure-reducing pump 30 is arranged in the position of the pressure pump 60 shown in FIG. 5, as shown in FIG. 15, then when reducing the pressure in the spaces W2 and 21, the water vapor and the like will pass through the main body 10 of the leak test apparatus 1. In FIG. 15, arrow R11 indicates the flow of the water vapor and the like that passes through the main body 10 of the leak test apparatus 1. In this case, the water vapor may end up adhering to the differential pressure sensor 11 and the like, which may cause the differential pressure sensor 11 and the like to fail.

On the other hand, in FIG. 5 the differential pressure sensor 11 and the like are prevented from failing by directly connecting the pressure-reducing pump 30 to the work W.

The structure of the humidifying mechanism 40 is not limited to this example embodiment. For example, the humidifying mechanism 40 may also be structured as described in the modified examples described below.

Figure 11:
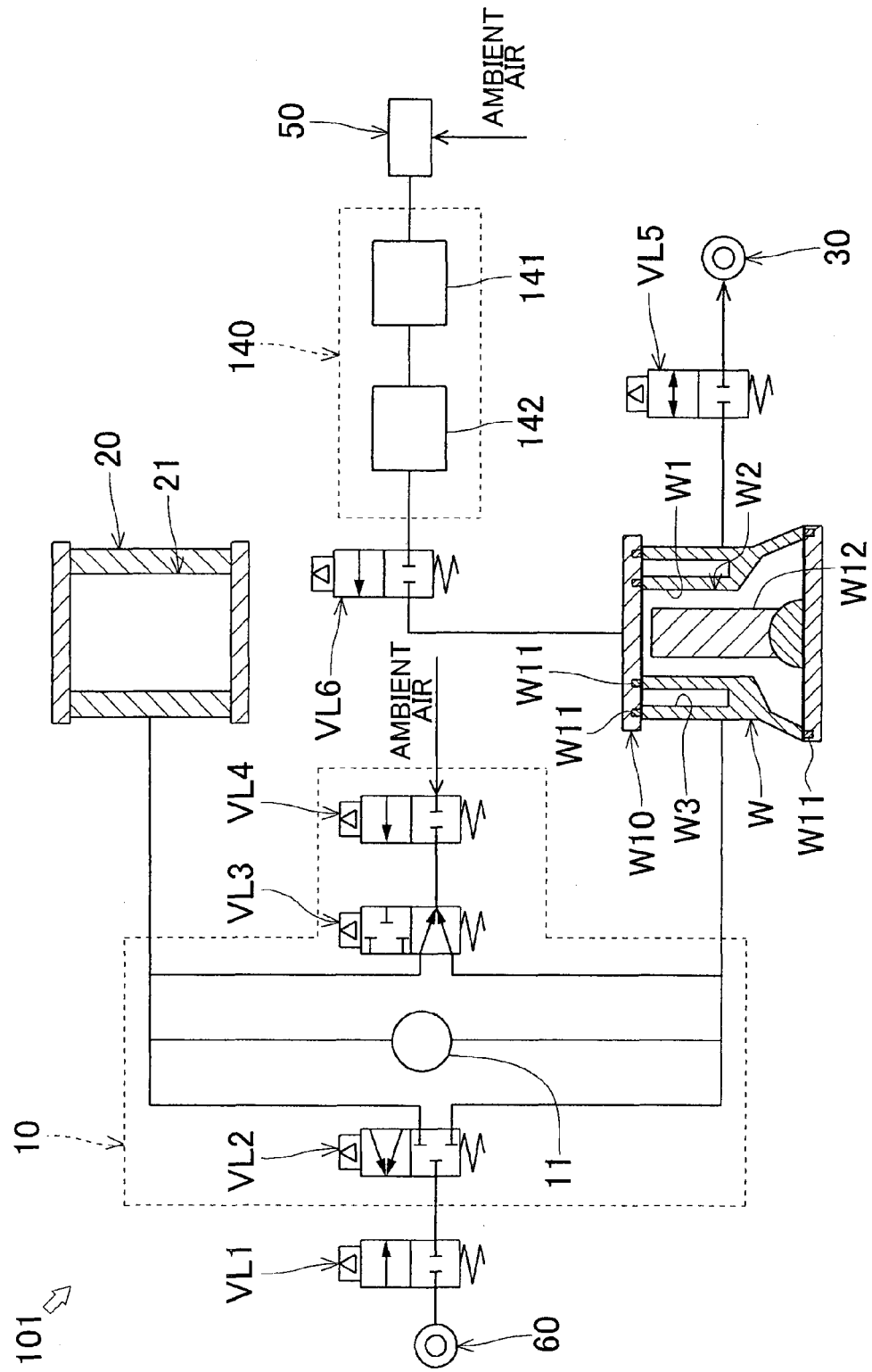
FIG. 11 is a view of a first modified example of the leak test apparatus.

As shown in FIG. 11, a humidifying mechanism 140 of a leak test apparatus 101 according to a first modified example includes a water vapor source 141 and a buffer tank 142. The water vapor source 141 and the buffer tank 142 are connected to the work W. The humidifying mechanism 140 in this modified example generates water vapor or water mist with the water vapor source 141, and stores the water vapor or water mist in the buffer tank 142.

Figure 12:
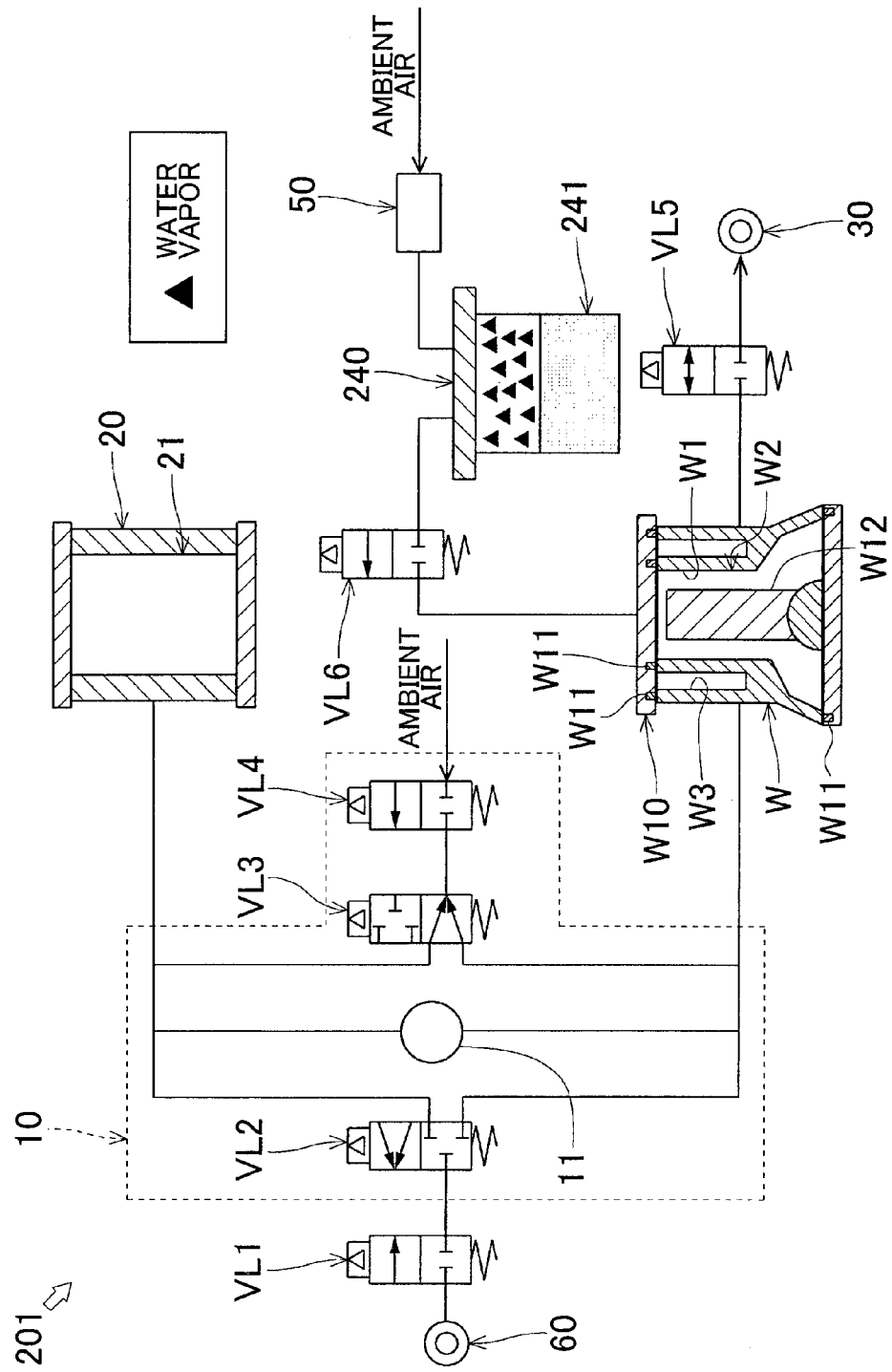
FIG. 12 is a view of a second modified example of the leak test apparatus.

As shown in FIG. 12, a humidifying mechanism 240 of a leak test apparatus 201 according to a second modified example is constituted of a water vapor generating tank, and is connected to the work W. The humidifying mechanism 240 in this modified example stores hot water 241, and generates air that has been humidified to a state near a water-vapor saturated state in the remaining space (i.e., a space formed between the hot water 241 and the inside of the water vapor generating tank). In FIG. 12, saturated water vapor is indicated by black triangles. The humidifying mechanism 240 keeps the hot water 241 that is stored at a predetermined temperature with a temperature regulating mechanism, not shown.

When performing the humidifying step using the humidifying mechanism 140 and 240 of the first and second modified examples, the valves VL1 to VL6 are controlled based on the valve sequence during the humidifying step shown in FIG. 4, and the pressure in the spaces W2 and 21 is reduced by the pressure-reducing pump 30. By reducing the pressure in the inspection space W2 in the work W, the humidifying mechanism 140 and 240 of the first and second modified examples introduces the water vapor, water mist, or humidified air into the inspection space W2 in the work W. As a result, the humidifying mechanism 140 and 240 of the first and second modified examples humidifies the inspection space W2 in the work W from the outside.

The hot water 241 of the humidifying mechanism 240 of the second modified example is set to a higher temperature than the temperature of the inspection space W2 in the work W during the humidifying step. Therefore, humidified air introduced from the humidifying mechanism 240 includes water vapor that exceeds the saturated water vapor amount in the inspection space W2 in the work W. As a result, the humidifying mechanism 240 of the second modified example water-vapor saturates the inspection space W2 in the work W in the humidifying step.

In this way, in the humidifying step, the inspection space W2 in the work W is humidified from the outside by introducing fluid (such as water-vapor saturated air, water vapor, water mist, or humidified air or the like) into the inspection space W2 in the work W using the humidifying mechanism 40, 140, and 240 that is connected to the work W. Also, the humidifying mechanism 40, 140, and 240 is connected to the work W, and introduces fluid into the inspection space W2 in the work W. Therefore, the humidifying mechanism 40, 140, and 240 serves as a humidifying device for humidifying the inspection space W2 in the work W from the outside.

According to the leak test method and the leak test apparatus 1, 101, and 201 of the second modified example, the leak test may be continuously performed simply by replacing the work W that has completed the leak test. That is, the procedure in the standby state in FIG. 4 is able to be simplified. Also, when humidifying the inspection space W2 in the work W from the outside, using the humidifying mechanism 40 that uses the hollow fiber membranes 41a as in the example embodiment allows a reduction in size of the humidifying mechanism 40.

Figure 13:
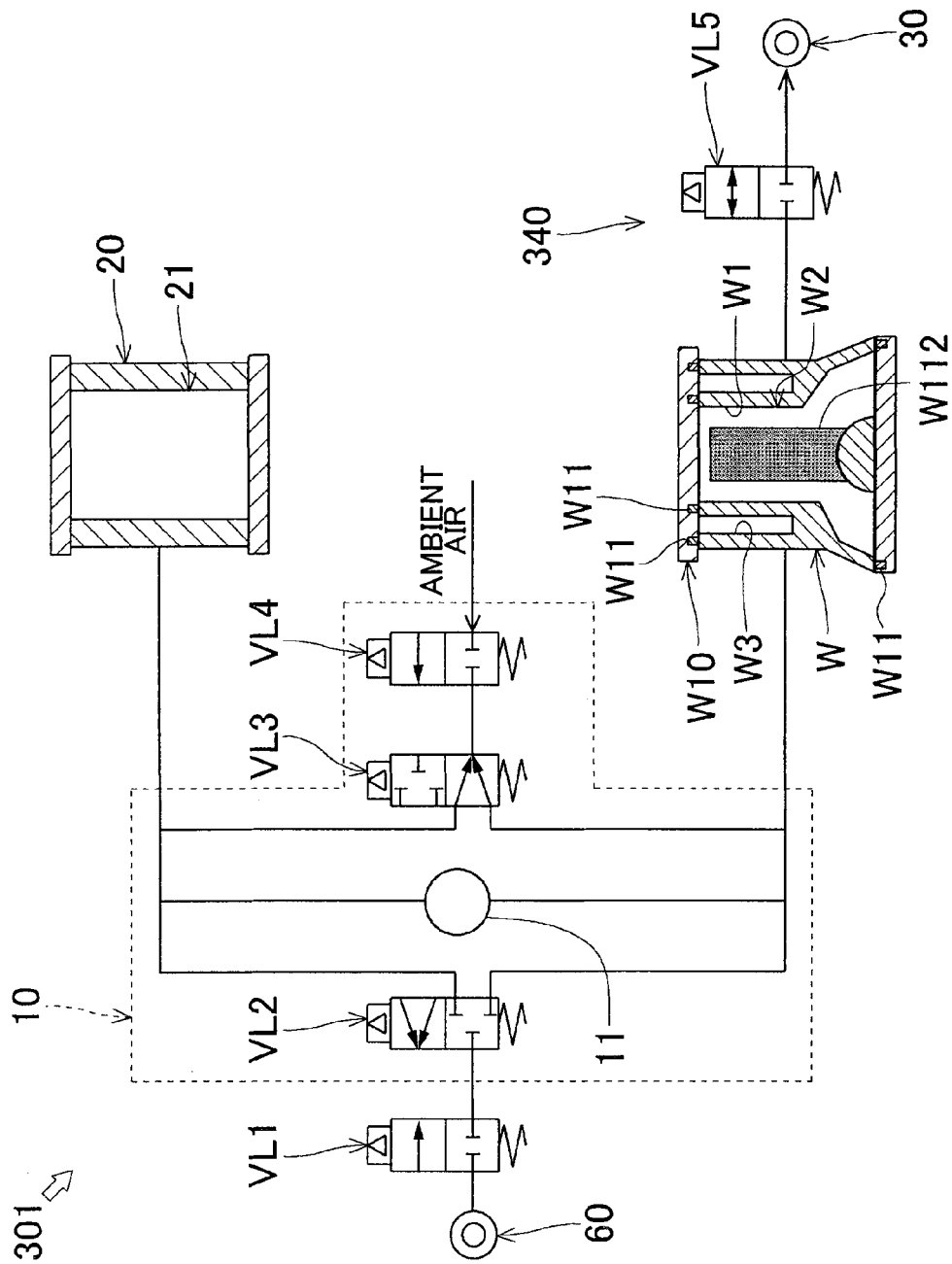
FIG. 13 is a view of a third modified example of the leak test apparatus.

As shown in FIG. 13, a humidifying mechanism 340 of a leak test apparatus 301 according to a third modified example includes water-retentive material. The water-retentive material is attached to a core W112 that contains (i.e., includes) water. That is, with the leak test apparatus 301 of the third modified example, the humidifying mechanism 340 is not connected to the work W, and the sixth valve VL6 and the throttle valve 50 and the like are not provided as they are in the example embodiment (see FIG. 1).

The water-retentive material is formed by material from which moisture in the material when the pressure is reduced vaporizes easily, e.g., porous material with a large moisture-containing surface area.

When performing a humidifying step using the humidifying mechanism 340 of the third modified example, the first valve VL1 to the fifth valve VL5 are controlled based on the valve sequence at the time of the humidifying step shown in FIG. 4, and the pressure in the inspection space W2 in the work W is reduced using the pressure-reducing pump 30.

As shown in FIG. 14, vaporization of the moisture in the water-retentive material is promoted by reducing the pressure in the inspection space W2 in the work W. Vaporization of the moisture from the water-retentive material is indicated by the water vapor in FIG. 14. As a result, the humidifying mechanism 340 of the third modified example humidifies the inspection space W2 in the work W from the inside.

In this way, in the humidifying step, the water-retentive material is arranged in the inspection space W2 in the work W, and the pressure in the inspection space W2 in the work W is reduced. Consequently, the moisture in the water-retentive material vaporizes, and the inspection space W2 in the work W is humidified from the inside. Also, the humidifying mechanism 340 of the third modified example serves as a humidifying device for vaporizing the moisture in the water-retentive material by reducing the pressure in the inspection space W2 in the work W, and thus humidifying the inspection space W2 in the work W from the inside.

According to the leak test method and the leak test apparatus 301 of the third modified example, there is no need to provide the sixth valve VL6 and the throttle valve 50 and the like, so the valve sequence is able to be simplified. Also, the structure of the leak test apparatus 301 is able to be simplified, so the cost can be reduced.

The invention claimed is:
1. A leak test method comprising:
reducing first pressure in an inspection space in a work and second pressure in a space in a master chamber;
humidifying the inspection space in the work; and detecting a change in differential pressure between the inspection space in the work and the space in the master chamber, while the inspection space in the work is in a water-vapor saturated state, wherein a leak in the inspection space in the work is detected from the change in the differential pressure.

2. The leak test method according to claim 1, wherein in humidifying the inspection space in the work, the first pressure is reduced while water-retentive material is arranged in the inspection space in the work.

3. The leak test method according to claim 1, wherein:
in humidifying the inspection space in the work, the inspection space in the work is humidified from outside by introducing fluid into the inspection space in the work by a humidifying device that is connected to the work; and
the fluid includes water vapor.

4. The leak test method according to claim 3, wherein the first pressure and the second pressure are reduced simultaneously with humidification of the inspection space in the work by reducing the first pressure, while a flowrate of the fluid introduced into the inspection space in the work is regulated by a throttle valve.

5. A leak test apparatus comprising:
a master chamber;
a pressure-reducing device that is configured to reduce first pressure in an inspection space in a work and a second pressure in a space in the master chamber;
a humidifying device that is configured to humidify the inspection space in the work; and
a detecting device that is configured to detect a change in differential pressure between the inspection space in the work and the space in the master chamber, while the inspection space in the work is in a water-vapor saturated state, wherein a leak in the inspection space in the work is detected from the change in the differential pressure.

6. The leak test apparatus according to claim 5, wherein:
the humidifying device includes water-retentive material arranged in the inspection space in the work; and
moisture in the water-retentive material is vaporized by reducing the first pressure.

7. The leak test apparatus according to claim 5, wherein:
the humidifying device is connected to the work, and humidifies the inspection space in the work from outside by introducing fluid into the inspection space in the work; and
the fluid includes water vapor.

8. The leak test apparatus according to claim 7, further comprising a throttle valve that is configured to regulate a flowrate of the fluid introduced into the inspection space in the work,
wherein the first pressure and the second pressure are reduced simultaneously with humidification of the inspection space in the work by reducing the first pressure, while the flowrate of the fluid introduced into the inspection space in the work is regulated by the throttle valve.

* * * * *